(12) United States Patent
Sanders et al.

(10) Patent No.: US 10,365,107 B2
(45) Date of Patent: Jul. 30, 2019

(54) SYSTEMS AND METHODS FOR REDUCING POLARIZATION-RELATED BIAS ERRORS IN RFOGS

(71) Applicant: Honeywell International Inc., Morris Plains, NJ (US)

(72) Inventors: Glen A. Sanders, Scottsdale, AZ (US); Marc Smiciklas, Phoenix, AZ (US); Tiequn Qiu, Glendale, AZ (US); Jianfeng Wu, Tucson, AZ (US); Lee K. Strandjord, Tonka Bay, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/668,676

(22) Filed: Aug. 3, 2017

(65) Prior Publication Data
US 2019/0041215 A1     Feb. 7, 2019

(51) Int. Cl.
*G02B 6/02* (2006.01)
*G01C 19/72* (2006.01)

(52) U.S. Cl.
CPC ......... *G01C 19/727* (2013.01); *G01C 19/722* (2013.01); *G01C 19/726* (2013.01);
(Continued)

(58) Field of Classification Search
CPC .. G01C 19/727; G01C 19/722; G01C 19/726; G01C 19/72; G02B 6/02328; G02B 6/02361; G02F 2203/15
See application file for complete search history.

(56) References Cited

U.S. PATENT DOCUMENTS

| 4,326,803 A | 4/1982 | Lawrence |
| 4,514,088 A | 4/1985 | Coccoli |

(Continued)

FOREIGN PATENT DOCUMENTS

| EP | 1906146 A2 | 4/2008 |
| EP | 2189754 | 5/2010 |

(Continued)

OTHER PUBLICATIONS

U.S. Patent and Trademark Office, "Advisory Action for U.S. Appl. No. 14/526,300", dated Mar. 8, 2018, pp. 1-6, Published in: US.

(Continued)

*Primary Examiner* — Dominic J Bologna
(74) *Attorney, Agent, or Firm* — Fogg & Powers LLC

(57) ABSTRACT

Systems and methods for reducing polarization-related bias errors in RFOGS are described herein. In certain implementations, an RFOG system includes a fiber optic resonator, one or more laser sources, wherein light from the laser sources launches first and second optical beams into the fiber optic resonator in opposite directions, and an electro-optically tunable devices in the resonator path configured to modulate the phase difference between polarization components in the first and second optical beams as the optical beams propagate within the fiber optic resonator. The system further includes at least one photodetector, wherein the polarization components of the first and second optical beams are incident on the photodetector, wherein the at least one photodetector provides an electrical signal, and at least one processing unit configured to receive the electrical signal and calculate a rotation rate for the RFOG and provide a drive signal for the electro-optically tunable device.

17 Claims, 6 Drawing Sheets

(52) U.S. Cl.
CPC ..... *G02B 6/02328* (2013.01); *G02B 6/02361* (2013.01); *G02F 2203/15* (2013.01)

(56) References Cited

U.S. PATENT DOCUMENTS

| | | | |
|---|---|---|---|
| 4,530,097 A | 7/1985 | Stokes et al. | |
| 4,560,097 A | 12/1985 | Reynolds et al. | |
| 4,637,722 A | 1/1987 | Kim | |
| 4,881,817 A * | 11/1989 | Kim | G01C 19/72 356/460 |
| 5,018,857 A | 5/1991 | Sanders et al. | |
| 5,137,356 A | 8/1992 | Malvern | |
| 5,239,362 A | 8/1993 | Kajioka | |
| 5,327,213 A * | 7/1994 | Blake | G01C 19/72 356/460 |
| 5,349,441 A | 9/1994 | Sanders | |
| 5,351,252 A | 9/1994 | Toyama et al. | |
| 5,606,415 A | 2/1997 | Doty | |
| 7,327,460 B2 | 2/2008 | Sanders et al. | |
| 7,933,020 B1 | 4/2011 | Strandjord et al. | |
| 8,009,296 B2 | 8/2011 | Sanders et al. | |
| 8,098,380 B2 | 1/2012 | Sanders et al. | |
| 8,213,019 B2 | 7/2012 | Strandjord et al. | |
| 8,223,341 B2 | 7/2012 | Strandjord et al. | |
| 8,259,301 B2 | 9/2012 | Strandjord et al. | |
| 9,097,526 B1 * | 8/2015 | Sanders | G01C 19/721 |
| 9,354,064 B2 | 5/2016 | Strandjord et al. | |
| 9,587,945 B2 | 3/2017 | Strandjord et al. | |
| 2002/0051133 A1 | 5/2002 | Honda et al. | |
| 2003/0031415 A1 | 2/2003 | Gonthier et al. | |
| 2012/0133923 A1 | 5/2012 | Lefevre et al. | |
| 2012/0281225 A1 | 11/2012 | Digonnet et al. | |
| 2012/0281226 A1 | 11/2012 | Digonnet | |
| 2012/0281954 A1 | 11/2012 | Kreuzer et al. | |
| 2013/0271770 A1 | 10/2013 | Sanders et al. | |
| 2014/0029011 A1 | 1/2014 | Digonnet et al. | |
| 2014/0044142 A1 | 2/2014 | Strandjord et al. | |
| 2015/0022818 A1 | 1/2015 | Llyod et al. | |
| 2015/0369605 A1 | 12/2015 | Strandjord et al. | |
| 2015/0369606 A1 * | 12/2015 | Sanders | G01C 19/727 356/461 |
| 2016/0003619 A1 | 1/2016 | Strandjord et al. | |
| 2016/0084654 A1 | 3/2016 | Senkal et al. | |
| 2016/0146607 A1 | 5/2016 | Celikel | |

FOREIGN PATENT DOCUMENTS

| | | |
|---|---|---|
| EP | 2428767 | 3/2012 |
| EP | 2701250 | 2/2014 |
| EP | 2896935 A1 | 7/2015 |
| JP | 2017125315 A | 7/2017 |

OTHER PUBLICATIONS

U.S. Patent and Trademark Office, "Notice of Allowance", U.S. Appl. No. 14/526,300; dated Jun. 14, 2018, pp. 1-9; Published: US.
Sanders et al., "Symmetric Three-Laser Resonator Fiber Optic Gyroscope", "U.S. Appl. No. 14/312,009, filed Jun. 23, 2014", , pp. 125, Published in: US.
Strandjord et al., "Resonantor Fiber Optic Gyroscope Employing Common Cavity Length Modulation Along With High Bandwidth Laser Stabilization", "U.S. Appl. No. 14/325,006, filed Jul. 17, 2014", , pp. 129, Published in: US.
U.S. Patent and Trademark Office, "Office Action", "U.S. Appl. No. 14/526,300", dated Apr. 19, 2016, pp. 1-40, Published in: US.
European Patent Office, "Communication under Rule 71(3) EPC", dated Apr. 15, 2016, pp. 1-35, Published in: EP.
European Patent Office, "Extended European Search Report from EP Application No. 15169513.7 dated Oct. 16, 2015", "from Foreign Counterpart of U.S. Appl. No. 14/526,300", filed Oct. 16, 2015, pp. 1-6, Published in: EP.
U.S. Patent and Trademark Office, "Advisory Action", "U.S. Appl. No. 14/526,300", dated Dec. 30, 2016, Published in: US.
U.S. Patent and Trademark Office, "Final Office Action", "U.S. Appl. No. 14/526,300", dated Oct. 7, 2016, pp. 1-30, Published in: US.
U.S. Patent and Trademark Office, "Office Action", "U.S. Appl. No. 14/526,300", dated Jun. 12, 2017, pp. 1-28, Published in: US.
Hotate et al., "Resonator Fiber Optic Gyro Using Digital Serrodyne Modulation-Method to Reduce the Noise Induced by the Backscattering a", "13th International Conference on Optical Fiber Sensors", Apr. 12-16, 1999, pp. 104-107, vol. 3746, Publisher: SPIEE.
Sanders et al., "Novel Polarization-rotating Fiber Resonator for Rotation Sensing Applications", "Fiber Optic and Laser Sensors VII", 1989, pp. 373-381, vol. 1169, Publisher: Proc. SPIE.
Strandjord et al., "Performace Improvements of a Polarization-Rotating Resonator", "Fiber optic and Laser Sensors X", 1992, pp. 94-103, vol. 1975, Publisher: SIPE.
Wang et al., "Reduction of Polarization-Fluctuation Induced Drift in Resonator Fiber Optic Gyro by a Resonator With TWIM 90 Degree Polarization-Axis Rotated Splices", "Optics Express", Jan. 14, 2010, pp. 1677-1683, vol. 18, No. 2.
Yu et al., "Improving Thermal Stability of a Resonator Fiber Optic Gyro Employing a Polarizing Resonantor", "Optics Express", Jan. 4, 2013, pp. 358-369, vol. 21, No. 1, Published in: CN.
U.S. Patent and Trademark Office, "Final Office Action", "U.S. Appl. No. 14/526,300", dated Nov. 30, 2017, pp. 1-18, Published in: US.
European Patent Office, "Extended European Search Report from EP Application No. 18186433.1 dated Jan. 30, 2019", from Foreign Counterpart to U.S. Appl. No. 15/668,676, filed Jan. 30, 2019, pp. 1-6, Published: EP.

* cited by examiner

SYSTEMS AND METHODS FOR REDUCING POLARIZATION-RELATED BIAS ERRORS IN RFOGS

BACKGROUND

Commercial navigation applications can be improved by using low cost, small sized navigation grade gyroscopes. Resonator fiber optic gyroscope (RFOG) may be a promising contender for meeting the performance desires for the afore-mentioned commercial navigation applications. In particular, an RFOG has the potential to provide a navigation grade solution with the desired combination of low cost, small package size, and weight. The RFOG uses at least two laser beams, where at least one of the laser beams propagates around a resonator coil in the clockwise (CW) direction and at least one other laser beam propagates around a resonator coil in the counter-clockwise (CCW) direction. In the operation of the RFOG, it is desirable to tune the frequencies of the at least two laser beams to the resonance frequencies of the fiber optic ring resonator. In tuning the frequencies, the resonance frequencies may be measured in the CW and CCW direction. The input beam frequencies may be compared and the difference between the input beam frequencies is proportional to the rotation rate of the resonator coil. However, an indicated output may be present when the gyroscope is not rotating. A measured output when no rotation is present is known as a bias, and the instability of the bias is known as bias instability. Bias instability affects the ability of the RFOG to produce accurate measurements.

One source of bias instability in RFOGs is that the light, used to measure rotation, can propagate within the resonator sensing loop in two polarizations, where the two polarizations of light can be incident on the resonator. When the light is input into the resonator and the light does not entirely couple into only one resonance of the resonator, errors can be produced that cause bias instability. These errors arise because the light that propagates in the two polarization states of the resonator interfere with each other at the gyro output as the fiber changes the difference in refractive index along two axes for the fiber (birefringence).

SUMMARY

Systems and methods for reducing polarization-related bias errors in RFOGS are described herein. In certain implementations, an resonating fiber optic gyroscope system includes a fiber optic resonator, one or more laser sources, wherein light from the one or more laser sources launches a first optical beam into the fiber optic resonator and a second optical beam into the fiber optic resonator in a direction opposite to the first optical beam, and an electro-optically tunable device in the resonator path configured to modulate the phase difference between polarization components in the first optical beam and polarization components in the second optical beam as the first optical beam and the second optical beam propagate within the fiber optic resonator. The system further includes at least one photodetector, wherein the polarization components of at least one of first optical beam and the second optical beam are incident on the photodetector, wherein the at least one photodetector provides an electrical signal, and at least one processing unit configured to receive the electrical signal and calculate a rotation rate for the resonating fiber optic gyroscope and provide a drive signal for the electro-optically tunable device.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1A:
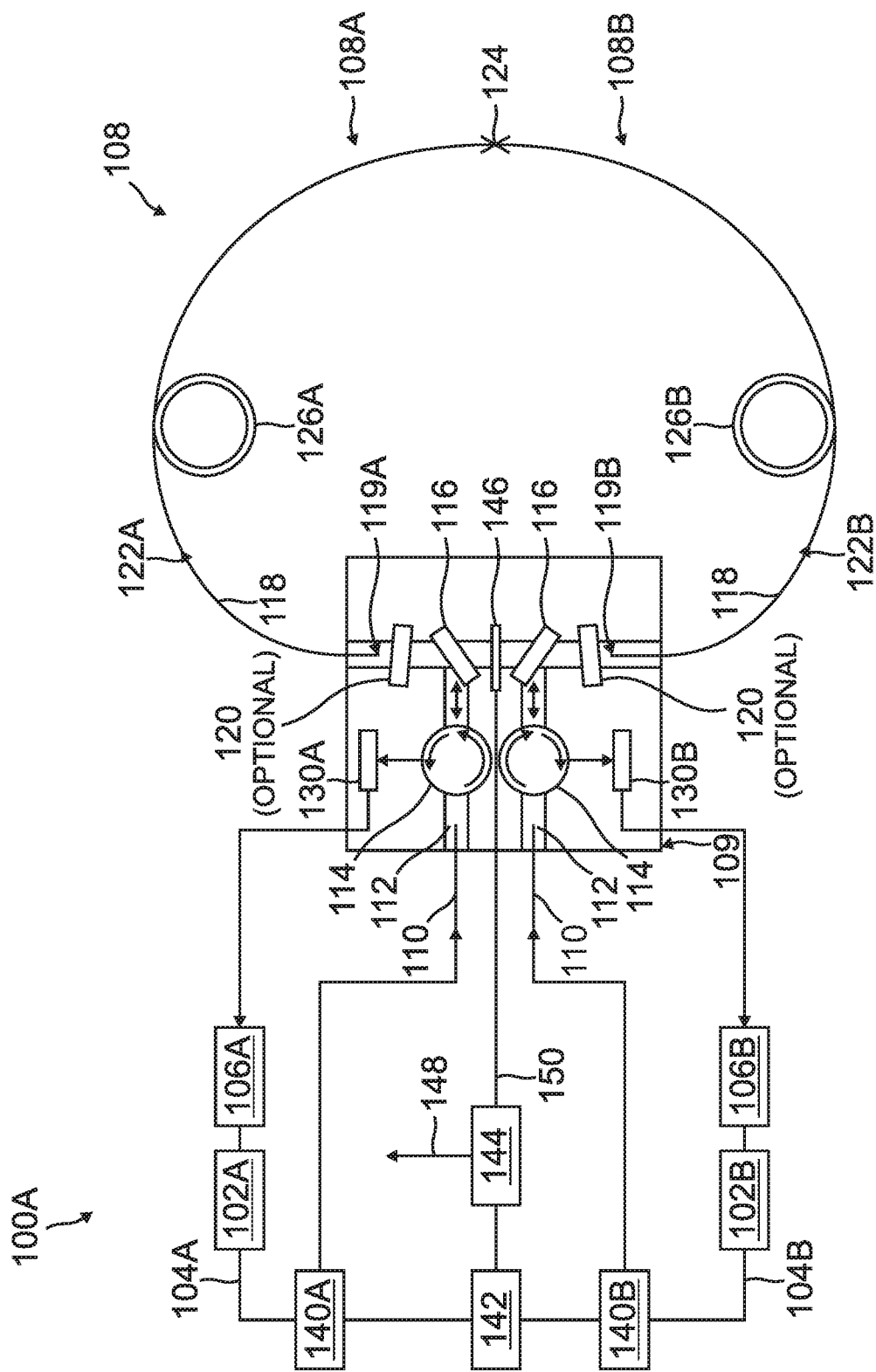
FIGS. 1A and 1B are block diagrams illustrating a representative resonator fiber optic gyroscope of one embodiment of the present disclosure.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide for systems and methods for the reduction of polarization-related bias errors by stabilization of the polarization states in resonator fiber optic gyroscopes. There are two "polarization states" of the resonator, sometimes referred to as "polarization eigenstates of the resonator", or "polarization eigenstates". At each point along the resonator, the polarization state of light traveling within a polarization eigenstate will reproduce itself after each round trip around the resonator. As the light in an eigenstate travels around the resonator, it may change polarization state from point to point along the resonator path, but at a given point the polarization state will reproduce itself after each round trip around the resonator. After each round trip, light in the eigenstate will have the same polarization state at a given point; however each successive trip may attenuate the light amplitude and its phase. The eigenstates of the resonator that reproduce themselves around the resonator may consist of, at any point along the resonator, a component of light on one principal axis of the fiber, and a component of light that is on the other principal axis of the fiber. Changes in the fiber's relative index of refraction between its principal axes, that is, changes to its birefringence, will change the state of polarization of the eigenstate of the resonator at a given point along the resonator path. The temperature of the fiber can generally change its birefringence and alter the state of polarization of the eigenstate at a given point in the resonator. If light is undesirably traveling in both eigenstates, which have different polarizations and different total pathlengths along the resonator path, then the interference between them can change as temperature changes. To reduce the polarization-related bias errors, temperature induced changes to the interference between the two polarization states may be passively reduced such that a small electro-optically tunable device located in the resonator may alter the path length difference between the two polarization states. Through analysis of the resultant interferometer signal, the electro-optically tunable device adjusts the path length difference between the two polarization states to null out or stabilize the interference between the two polarization states and the bias that results from the interference between different polarization states.

The passive stabilization between the two states that provides the first part of this approach is the use of a 90 degree rotations of polarization within the ring resonator that allow the path length difference between two polarization states to be very close to zero, and the temperature dependence of that path length difference to be very small. In configurations with the 90 degree rotation within the ring resonator, each polarization state of each laser spends half of its time on each of the principal axes of the fiber that have different refractive indices. As such, small change in birefringence caused by an signals provided to an electro-optic modulator may be effective in countering residual birefringence in the coil and changes in the coil due to temperature. The electro-optic modulator may be introduced into the resonator as a small element (like an optoceramic element), where the electro-optic modulator has a DC response and an AC response to an applied voltage. The small electro-optically tunable device may be located in the resonator to modulate the pathlength difference between two polarization states. This modulation is done at a frequency that is well above the frequency band in which the rotation rate is varying. The output of the gyroscope at the higher frequency is analyzed via signal processing techniques. For example, the gyroscope output may have a resulting cyclical bias due to the modulation of the interference between polarization states. By analyzing the output signal at the frequency of the electro-optical modulation, the interference between the polarization states may be sensed and its DC mean adjusted to zero or stabilized to a constant value so the bias is not unstable. This is done by applying a DC voltage to the electro-optical transducer. Once the mean of the interference between the polarization states is zeroed or set to a fixed value, the drift of the bias error will be reduced and the absolute value of the bias will be either be reduced to negligible levels, or sufficiently stable.

FIG. 1A is a block diagram of an example RFOG 100A (figure shows 100A, not 100). RFOG 100A measures the resonance frequency shift between two light waves 122A and 122B that are introduced into a ring resonator 108 and directed to propagate in different directions through the ring resonator 108. Components that aid in reducing polarization-related bias errors are described in greater detail below.

FIG. 1A describes an RFOG 100A that comprises tunable light sources 102A and 102B that respectively produce and emit tunable light beams 104A and 104B. A tunable light source in the tunable light sources 102A and 102B may be at least one of a tunable laser, a laser diode, an optical frequency comb, or other suitable tunable light source). As described herein, the tunable light sources are referred to generally as light sources 102A and 102B and the tunable light beams are referred to generally as light beams 104A and 104B. In certain implementations, the light sources 102A and 102B may comprise two light sources. Alternatively, the tunable light sources 102A and 102B may comprise more than two light sources or less than two light sources. In one particular example, a light source 102A may tune a light beam 104A to have a frequency $f_1$ and a second light source 102B tunes a light beam to have a frequency $f_2$.

Preferably, the relative frequency drift and jitter between the two light frequencies $f_1$ and $f_2$ is substantially reduced to a level that does not affect the accuracy and stability of the frequency shift, $f_2-f_1$, and thus the rotational rate measurement. To reduce the relative frequency drift and jitter between the two light frequencies, the light frequencies $f_1$ and $f_2$ can be locked to the resonance frequencies of the resonator 108 with servos 106A and 106B.

Figure 1B:
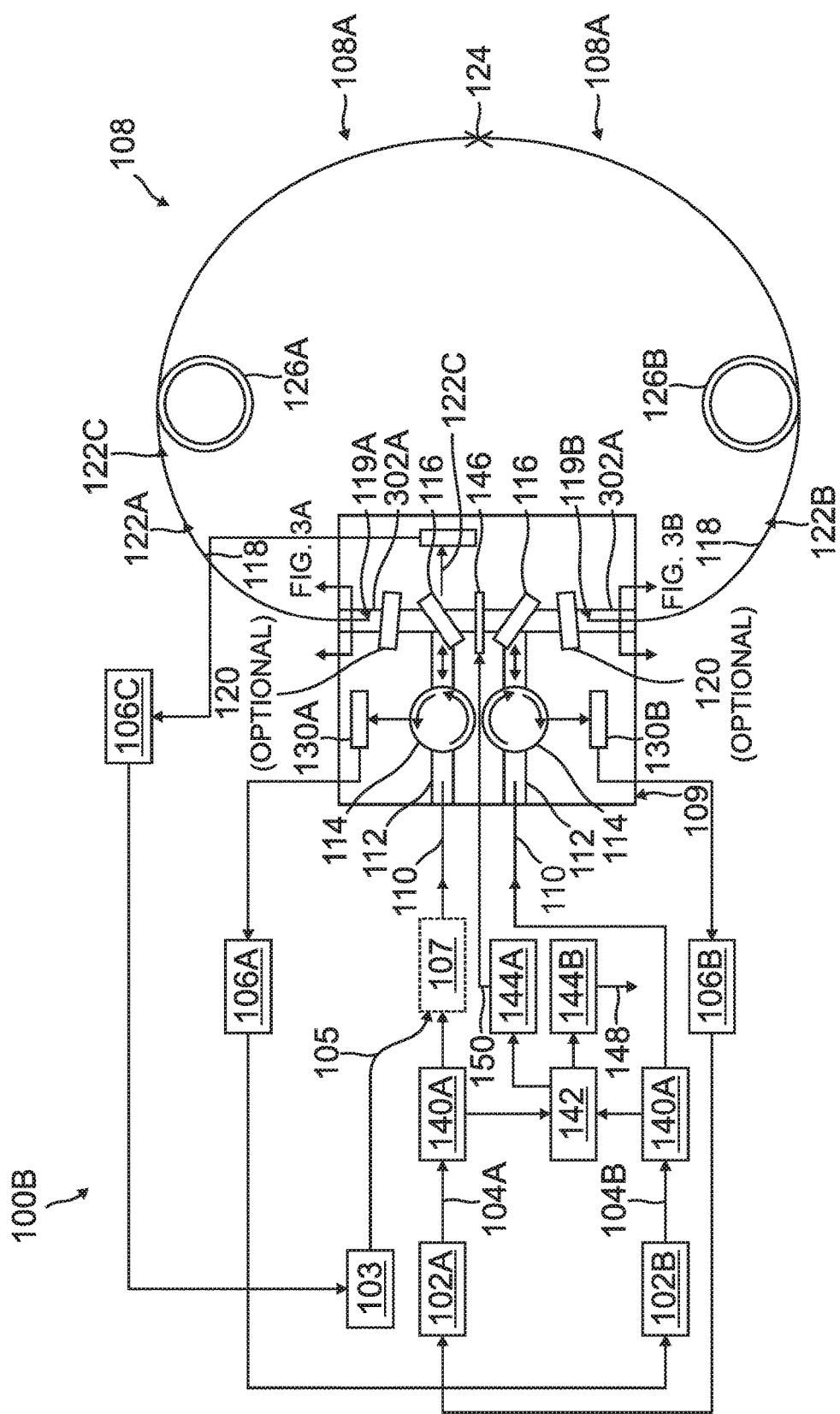

In at least one implementation, to further increase stabilization of the lasers, there may be a master light source 103 that is stabilized to a resonance at a frequency $f_0$, using a servo 106C, which frequency $f_0$ is different from the resonant frequencies $f_1$ and $f_2$ of the resonator 108 as shown in FIG. 1B. The light beam 105 from the master light source 103 may be combined with one or both of the light beams 104A and 104B from the tunable light sources 102A, 102B, which light beams 104A and 104B function as slave lasers when they are combined with the master light beam 105. For example, the light beam 105 from the master tunable light source 103 may be combined with the light beam 104A from the light source 102A using a coupler 107. Each tunable light source that is slaved by phase locking, with a tunable offset frequency shift, to the light produced by the master tunable light source 103 may have an associated feedback control that receives a signal from a photo-detector associated with a particular transmission port and adjusts the tunable frequency shift to center slave lasers 102A and 102B to the centers of CW and CCW resonances. For example, when the RFOG 100A has two tunable light sources 102A and 102B; one or both of the lasers that propagates in the resonator 108 may be circulated toward one of the photo-detectors 130A and 130B, where the photo-detectors 130A and 130B provide a signal to the feedback control for the tunable light sources 102A and 102B that propagate in the resonator 108.

The light beams 104A and 104B generated by the light sources 102A and 102B may be coupled to an optical chip 109. In certain embodiments, the light beams 104A, 104B can be coupled from the light sources 102A, 102B to the optical chip 109 using an optical fiber 110. In some embodiments, once the light beams 104A and 104B enter the optical chip 109, the optical chip 109 may contain waveguides or a free space optical path 112 for guiding the light beams 104A and 104B within the optical chip 109. In exemplary embodiments, the ends of the optical fiber 110 can be angle cleaved. Angle-cleaving the ends of the optical fiber 110 may reduce the backscatter reflection that couples back into the fiber waveguide in the opposite direction that results due to transitioning from a first material having a first index of refraction to a second material having a second index of refraction that is different from the first index of refraction. Additionally, the ends of the optical fiber 110 may be coated with an anti-reflection coating to further reduce back-reflected light, either in combination with an angle cleave or with a standard non-angle cleaved endface. It is also possible to put high index coatings around the tip of the optical fiber 110 to make sure that light that is back-reflected into the cladding at an angle is fully absorbed out of the optical fiber 110 and is impeded from propagating back into the core of the optical fiber 110.

In some embodiments the waveguide or free space optical path 112 is a waveguide. Once the light beams 104A and 104B enter the optical chip 109, the waveguides or free space paths 112 guide the light beams 104A and 104B within the optical chip 109. First, the waveguides 112 guide the light beams 104A and 104B to optical circulators 114. In exemplary embodiments, the optical circulators 114 may have a vertical pass-axis, which polarizes the light beams 104A and 104B in the vertical direction. In other embodiments, the optical circulators 114 may have a pass-axis in a different orientation than vertical or not have a pass-axis at all, which in this case, the optical circulators 114 may pass light with various orientations. In other embodiments, there is no waveguide on optical chip 109; rather the light beams 104A and 104B may travel in free space above the chip surface from fiber to components like optical circulator 114, partially reflective mirror 116, and polarizers 120.

In addition to polarizing the light beams 104A and 104B, the optical circulators 114 may direct the light beams 104A and 104B to a coupling device 116 that couples the light beams 104A and 104B into the resonator 108. In exemplary embodiments, the coupling devices 116 may be weakly-reflective mirrors 116 that are angled to direct the light from the optical circulators 114 into the fiber optic coil 118 of the resonator 108. In other embodiments, the coupling devices 116 are fiber optic couplers, waveguides, or other suitable components. In certain implementations, weakly-reflective mirrors may be preferred over other types of coupling devices because other types of couplers can introduce cross-coupling between different polarizations. For example, fiber optic couplers using polarization maintaining fiber can introduce a cross coupling of about 1% of the light between principal polarization axes of the fiber within the coupler, which can degrade the accuracy of the RFOG 100. The circulators 114 also couple light 122A and 122B from the resonator 108 to photodetectors 130A-130B where the photodetectors 130A-130B sample the light 122A-122B from resonator. Light from the master input beam 105 that propagates in the resonator as lightwave 122C is sampled in reflection from the resonator as a combination of input light 105 and light from beam 122C forming a beam that is incident on detector 130C. Embodiments that utilize servos 106A-106C may couple the light received by the photodetectors 130A-130C to tune the frequencies of $f_1$, $f_2$, and $f_0$ of the light sources 102A and 102B (and 103 as illustrated in FIG. 1B), respectively.

As mentioned above, the light beams 104A and 104B are coupled from the optical chip 109 to the resonator 108 by coupling devices 116. In exemplary embodiments, however polarizers 120 can be included in the optical chip 109 between the coupling devices 116 and the fiber optic coil 118 of the resonator 108. In exemplary embodiments, the polarizers 120 can have a vertical pass-axis, antireflective coating and a slight angle relative to normal incidence. In other embodiments, the polarizers 120 can have a different pass-axis than vertical. In exemplary embodiments, the light is focused into each fiber end of the resonator by placing a lens on the chip (such as lenses 250 shown in FIG. 2) before the light enters fiber coil ends 119A and 119B. In exemplary implementations the lenses are ball lenses with anti-reflection coatings to prevent unwanted back-reflections.

After the light beams 104A and 104B pass through the polarizers 120, the light beams 104A and 104B enter the fiber optic coil 118 of the resonator 108. In exemplary embodiments, the fiber optic coil 118 is a polarization maintaining (PM) fiber and has a first end point 119A and a second end point 119B. The first end point 119A and the second end point 119B will also be referred to herein as "ends". Moreover, in exemplary embodiments, the ends of the fiber optic coil 118 can be angle-cleaved at 8 degrees or higher as discussed above. In other embodiments, the ends of the fiber optic coil 118 can be angle-cleaved at other angles. If the fiber is solid core fiber, it can also be anti-reflection (AR) coated to reduce back-reflections. Similar to above, angle-cleaving the ends of the fiber optic coil 118 will prevent reflection back into the waveguide 112 of the optical chip 109, or more importantly, prevent back-reflection of light from one direction of propagation in the resonator into the other direction. Note that hollow core fiber can also be used in this invention and angle-cleaving its endfaces can reduce back-reflections. Moreover, in exemplary embodiments, the ends of the fiber optic coil 118 can be secured within V-grooves on the optical chip 108 using an adhesive, such as an epoxy. When mounting hollow core fiber within the v-groove, the endfaces may be secured in the v-grooves without adhesive wicking into the hollow core of the fiber, which wicking into the hollow core fiber may negatively affect the light guidance properties of the hollow core fiber.

In certain exemplary embodiments, the fiber optic coil 118 may be a PM fiber. As PM fibers have a fast axis and a slow axis, called their principal axes, light travelling along one principal axis in the PM fiber is of one polarization state of the fiber. In the current disclosure, light travelling in one polarization eigenstate of the resonator is substantially polarized along one principal axis of the PM fiber at a given point along the fiber length. Light in the other polarization eigenstate of the resonator is substantially polarized along the other principal axis of the PM fiber at the same point along the fiber length. Ideally, the polarization of the light in the two eigenstates of the resonator are orthogonal at each point along the resonator path, and even in practice, the eigenstates are substantially orthogonal to each other. Ideally, PM fibers preserve the components of light traveling on each of the two principal axes of the fiber within the resonator. That is, ideally, PM fibers preserve the components of the light on each of the two axes without coupling light between them. As a result, if a beam of light is launched along one axis, the light should stay in that axis with the corresponding polarization. In certain implementations, the fast axis and the slow axis in the PM fiber are created by putting stress rods in the PM fiber. The stress rods create birefringence in the fiber optic coil 118, which changes the speed of light on one axis versus the other axis due to the axes having different indexes of refraction. Light that has a polarization perpendicular to the plane of the stress rods is travelling along the fast axis, while light that has a polarization parallel to the plane of the stress rods is travelling along the slow axis. The light may have a vertical polarization when launched into the fiber coil and since the light has a polarization perpendicular to the plane of the stress rods, the light is travelling along the fast axis of the PM fiber 118. Further, the light may have a vertical polarization when launched into the fiber coil, which polarization is parallel to the plane of the stress rods and, therefore, the light may travel in the slow axis of the PM fiber 118. In exemplary embodiments, the plane of the stress rods in the fiber optic coil 118 is parallel to the surface of the optic chip 109 and perpendicular to the polarization of the light in the v-groove in the optic chip 109; further, the plane of the stress rods in the fiber optic coil 118 is perpendicular to the surface of the optic chip 109 and parallel to the polarization of light in the V-groove due to the 90 degree splice 124 in the fiber optic coil 118, which is explained in more detail below.

Since PM fibers have two different axes with two different indexes of refraction, not only is the propagation constant different in the two different axes, but also, the change of the propagation constant as a function of temperature and stress in each axis is different. The difference between the different axes impacts the relative resonance frequencies of the two polarization eigenstates of the RFOG 100 and degrades performance of the RFOG 100 as temperature or stress fluctuates. To counter the temperature dependence problem found in some conventional implementations, the fiber optic coil 118 has a 90-degree splice 124 inserted into the fiber optic coil 118. In exemplary embodiments, the 90-degree splice 124 is inserted at the midpoint of the fiber optic coil 118. However, in some embodiments, the 90-degree splice 124 can be inserted approximately at the midpoint of the fiber optic coil 118. Due to this 90-degree splice 124 in the fiber optic coil 118, the light beams 104A, 104B spend equal amounts of time on the fast axis and the slow axis. As an example, the light wave in the desired polarization eigenstate of the resonator that is used in CW and CCW directions to measure rotation is propagating on the fast axis that can be represented by the top portion 108A of the resonator 108 and the slow axis that can be represented by the lower portion 108B of the resonator 108. Therefore, CW travelling light 122A will be travelling in the fast axis while in the top portion 108A of the resonator 108. Once the CW light 122A passes through the 90-degree splice 124 and into the lower portion 108B of the resonator 108, the light 122A will be in the slow axis of the resonator fiber 118 within resonator 108. As a result, the temperature dependence of the RFOG is reduced.

While introducing a 90-degree splice 124 into the fiber optic coil 108 has the advantage of reducing the temperature dependence of the fiber optic coil 118, the 90-degree splice 124 adds an additional problem if it were not for the orthogonally oriented fiber ends. Namely, (assuming polarizers 120 are not present) when a 90-degree splice is inserted into the fiber optic coil 118 without the orthogonally oriented ends, the polarization eigenstates of the resonator will have equal amounts of light on the two axes of the fiber and along its length of the fiber the eigenstates will vary between being circularly polarized, to elliptically polarized, to 45 degree linearly polarized, to elliptically polarized and back to circularly polarized. The input light beams 104A, 104B (assumed to be linearly polarized) would no longer couple correctly into one resonator polarization eigenstate if they were linearly polarized. Instead, the light beams 104A, 104B would have to equally excite the two eigenstates. For example, if injected light beams 104A, 104B were x-axis polarized light, it would excite two resonances within the resonator of equal size. Therefore, while the 90-degree splice 124 reduced the temperature dependence of the RFOG 100, there is now a polarization eigenstate of the resonator which is not linearly polarized along one axis of the coil fiber 118 which makes it difficult to match the input light beams 104A, 104B into only one polarization eigenstate of the resonator 108.

Some conventional implementations try to solve the temperature dependence problem by introducing two 90-degree splices. As a result, light spends an equal amount of time in the slow axis and an equal amount of time on the fast axis, so the temperature dependence is averaged out. In addition, two 90-degree splices enable the polarization eigenstates within the ring to be substantially linear states, and thus are easier to match into. However, this implementation has drawbacks with one being the precision of where the 90-degree splices are placed within the fiber optic coil need to be extremely accurate, so that the light is actually spending an equal amount of time in the slow axis and the fast axis, and that small deviations in splice angle from 90 degrees can significantly degrade the gyro accuracy. Also, this implementation does not have a symmetric input/output architecture, which can introduce errors as well.

To solve errors originating from the unwanted polarization, some conventional implementations have introduced polarizers into the fiber optic coil. However, this implementation introduces additional problems. For example, one problem with introducing polarizers into the fiber optic coil is that the loss in the fiber optic resonator increases. As a result, the signal to noise ratio in the gyro decreases. Moreover, by introducing polarizers into the fiber optic coil, more 0-degree splices are required.

The other problem with conventional implementations that add in two 90-degree splices into the fiber optic coil or that add in polarizers that require 0-degree splices to be inserted into the fiber optic coil is that at each splice backscattered light can result, which increases the chances of getting double backscattered light from a pair of splices or polarizers, or splice-polarizer pair. Double backscatter causes additional problems for RFOGs because it regenerates light in the forward direction that causes gyros errors.

To get rid of double back scatter, the embodiments in this disclosure introduce fiber stretchers 126A, 126B into the fiber optic coil 118. In exemplary embodiments, the fiber stretchers 126A, 126B are PZT cylinders. Moreover, in exemplary embodiments, fiber stretchers 126A, 126B are introduced into the fiber optic coil 118 between each pair of potential backscattering sites (i.e., between each set of the splices), so the backscatter can be randomized. However, for conventional implementations, introducing fiber stretchers 126A, 126B at each pair of potential backscattering sites is unrealistic because of the greater number of splices that conventional implementations entail. Each fiber stretcher 126A, 126B also adds size and cost to the RFOG 100.

To randomize the backscatter, the fiber stretchers 126A, 126B may provide a proper path-length change so that the phase modulation amplitude is 2.4 radians, corresponding to the first null of Bessel function $J_o$ (or a higher modulation amplitude corresponding to another null of the Bessel function $J_o$) between the initial light 122A, 122B and the double-backscattered light. The 2.4 radians is calculated as follows. The interference of the two waves (i.e., the initial light 122A, 122B and the double back scattered light) can be expressed as follows:

$$I = E_1^2 + E_2^2 + 2E_1E_2 \cos[\varphi(t)] \tag{1}$$

where I is the resulting light intensity of the two interfering waves, $E_1$ is the electric field amplitude of the first (CW or CCW) primary or signal wave, $E_2$ is the electric field amplitude of the second, or parasitic wave (CW or CCW), and $\varphi(t)$ is the relative phase between the two waves. The relative phase is shown to be a function of time, but also could be expressed as a function of temperature or some other environmental parameter that varies in time.

Equation (1) can be rewritten as $$I = E_1^2 + E_2^2 + 2E_1E_2 \cos[\varphi(t) + \theta_a \sin(\omega_m t)] \tag{2}$$

Using trigonometric identities Equation 2 can be rewritten as $$I = E_1^2 + E_2^2 + 2E_1E_2 \{\cos[\varphi(t) + \theta_a \sin(\omega_m t)]\} \tag{3}$$

The trig functions $\cos[\theta_a \sin(\omega_m t)]$ and $\sin[\theta_a \sin(\omega_m t)]$ can be expressed as an infinite series of Bessel functions, $$\cos[\theta_a \sin(\omega_m t)] = J_0(\theta_a) + 2\sum_{n=1}^{\infty} J_{2n}(\theta_a)\cos[2n\omega_m t] \tag{4}$$

-continued $$\sin[\theta_a \sin(\omega_m t)] = 2 \sum_{n=1}^{\infty} J_{2n-1}(\theta_a) \sin[(2n-1)\omega_n t] \quad (5)$$

In Equations 4 and 5 one can see all the terms in the two infinite series except for one will be varying at $\omega_m$ or some multiple integer of $\omega_m$. Therefore if the cavity modulation frequency $\omega_m$ is set high enough, all the terms except for one, the term $J_o(\theta_a)$, will vary at a sufficiently high enough frequency to be out of the band of interest and thus can be filtered out. The remaining term, $J_o(\theta_a)$, can be reduced by setting the cavity modulation amplitude $\theta_a$ to an appropriate value. $J_o(\theta_a)$ passes through zero at about a phase modulation amplitude of 2.4 radians, again at about 5.5 radians and then again at about 8.6 radians. The closer the phase modulation amplitude is made to one of these nulls the smaller the gyroscope sensing error. Therefore, as a result of the fiber stretchers 126A, 126B being chosen for the appropriate pathlength change, the backscatter error that results in conventional implementations is reduced.

In certain implementations, the RFOG 100A may include a small electro-optically tunable device 146 in the resonator path. For example, the electro-optically tunable device 146 may be located on the optical chip 109 between the partially reflective mirrors 116, yet the electro-optically tunable device 146 may be located at other locations in the resonator path, whether that location be on the optical chip 109 or off of the optical chip 109, within the resonator. One placement within the chip would be to use two devices, each between the location of the polarizer 120 and the fiber ends 119A and 119B. In this case, the electro-optic devices could be located between the polarizer and lens (see FIG. 2) that couples the light into the fiber ends 119A and 119B. The two electro-optically tunable devices could be driven with a common signal. As implemented, the electro-optically tunable device 146 may be a small device, located in the resonator path that alters the path length difference between the two polarization states of the light propagating through it on its two principal axes As such, it also alters the pathlength between the polarization eigenstates of the resonator. Tunable device 146 may thus be a birefringence modulator. In particular, based on the interferometer signal produced by the light from the light sources 102A and 102B, the electro-optically tunable device adjusts the path length difference between the two polarization eigenstates to stabilize the unwanted interference between ccw light waves coupled out of the resonator that were in the desired eigenstate and the undesired eigenstate reaching photodetector 130A, and the bias that results from the interference between light that was traveling in these different polarization states. The same is true for stabilizing interference of light propagating in the cw direction that is coupled to photodetector 130B. It should be noted that, while light in the desired and undesired eigenstates may be orthogonal (ideally) inside the resonator, the optics directing it out of the resonator to the photodetectors 130A and 130B may produce cross-coupling between polarizations prior to reaching photodetectors 130A and 130B; thus, enabling interference at the photodetectors 130A and 130B. In certain implementations, the electro-optically tunable device 146 may be an optoceramic element. In certain implementations, the electro-optically tunable devices may be an all-fiber device located in the resonator coil but mechanically perturbed or stretched in response to a drive signal to provide a differential phase shift between polarizations propagating within the resonator coil. In certain implementations, the electro-optically tunable device 146 may be a discrete optical element like an optoceramic element, that is pigtailed with PM fiber and located within the fiber coil and not on chip 109. In certain implementations, the electro-optically tunable device 146 may be a discrete optical element like an optoceramic element, that is located on a separate chip from chip 109 and pigtailed with PM fiber and located within the resonator loop. The cases where the element is pigtailed on a substrate separate from optical chip 109, care must be taken to avoid high loss within the resonator, which degrades its noise performance; however it has the advantage of not driving up the die size of chip 109.

In at least one embodiment, to stabilize the interference between the two polarization states, a coupler 140A couples a portion of the light beam 104A produced by the light source 102A and a coupler 140B couples a portion of the light beam 104B produced by the light source 102B such that the portions of the light beams 104A and 104B are incident on a photodetector 142. The photodetector 142 produces an electrical signal based on the beat note between light sources 102A and 102B incident on the photodetector 142. The beat note contains the indicated rotation rate as well as rotation rate errors due to the undesired interference detected by photodetectors 130A and 130B. The photodetector 142 then provides the electrical signal to a processing unit 144. The processing unit 144 receives the electrical signal and provides two outputs 148 and 150 based on the received electrical signal. The processing unit 144 provides the rotation rate on a rotation rate output 148 and a drive signal 150 to drive the electro-optically tunable device 146. As illustrated in FIG. 1A, where a single processing unit 144 provides the rotation rate output 148 and the drive signal 150, the processing unit 144 may calculate the rotation rate output 148 at a slower rate than the processing unit 144 calculates the output for the drive signal. Conversely, as illustrated in FIG. 1B, different processing units 144A and 144B may each receive the electrical signal from the photodetector 142 and then separably provide the rotation rate on rotation rate output 148 and the drive signals 150 for the electro-optically tunable device. For example, a fast processing unit 144A may provide the drive signal 150 to the electro-optically tunable device and a slower processing unit 144B may calculate the rotation rate and then provide the rotation rate output 148 for the RFOG 100.

In certain implementations, in providing the drive signal 150 to the electro-optically tunable device 146, the processing unit 144 provides the drive signal 150 as an AC triangle wave or a sinusoid biased about a DC voltage level. Over time, the relative frequencies of light beams 104A and 104B change, causing the beat frequency between them to change. The beat frequency changes will be at the frequency of the AC portion of the drive signal 150, or harmonically related to it. The processing unit 144 monitors the light beams 104A and 104B as the light beams 104A and 104B are incident on the photodetector 142. In certain implementations, the processing unit 144 monitors the light beams through multiple periods of the sinusoidal modulation to gather information about the mean of the difference between the frequencies of the light beams 104A and 104B. As stated above, the voltage of the drive signal 150 is determined by faster processing than the processing that calculates the rotation rate. The calculation is determined by faster processing in order to handle the data received by the photodetector. After finding the mean of the difference between the frequencies of the light beams 104A and 104B, the processing unit 144 may calculate a DC voltage for the drive signal 150 that adjusts the oscillation until the mean of interference between the different signals is zeroed or stabilized to a fixed value.

Figure 2:
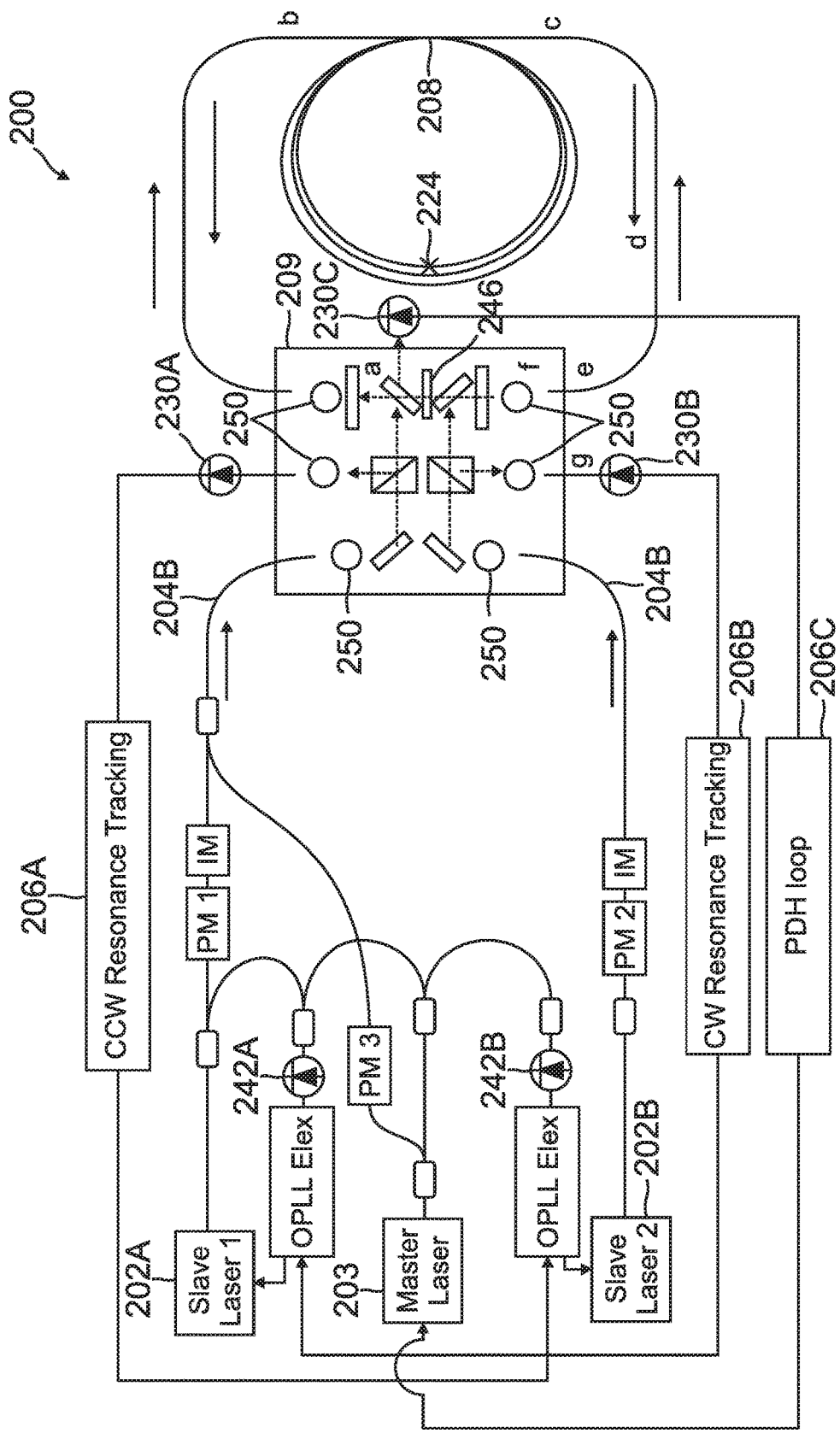
FIG. 2 is a block diagram illustrating a representative resonator fiber optic gyroscope of one embodiment of the present disclosure.

FIG. 2 is a block diagram of a further implementation of an example RFOG 200 having similar functionality to the RFOG 100B described in FIG. 1B. Further, in FIG. 2, markers a-g indicate locations in RFOG 200 where the light has different polarization states as it travels around the resonator 208. As illustrated, the RFOG 200 includes an optical chip 209 that contains similar components to the optical chip 109 described above with respect to FIGS. 1A and 1B. Further, the resonator 208 also includes a 90 degree splice 224 that functions in a similar manner to the 90 degree splice 124 described in FIGS. 1A and 1B. In a similar manner to FIGS. 1A and 1B, the optical chip 209 includes an electro-optically tunable device 246, that functions similarly to the electro-optically tunable device 146.

As shown in FIG. 2, light is coupled into the resonator 208 through the optical chip 209. In certain implementations, light that is coupled into the resonator 208 is coupled into the resonator into a principal axis of polarization to propagate in the fast axis of the fiber in resonator 208. Light entering into the fiber and aligned very accurately along the fast axis of the fiber is substantially completely in one polarization eigenstate of the resonator. For example, the light may be coupled into the resonator 208 principally in the vertical direction, which may be coupled into the fast axis of the resonator 208. However, the light may be incompletely coupled into the resonator 208 such that a component of the light may propagate through the resonator 208 with a polarization that is orthogonal to the light propagating along the fast axis of the resonator 208. For example, if most of the light is coupled into the resonator 208 in the vertical direction, a component of the light will be propagated into the resonator 208 in the horizontal direction.

As components of the light are coupled into the resonator 208 along different polarization axes of the fiber (and thus, to a high degree, in different polarization eigenstates of the resonator), the different components of the light may have different phase propagations through the resonator 208. For example, the light coupled into the resonator 208 along the fast axis may propagate through the resonator 208 with a faster phase propagation than the smaller component coupled into the resonator 208 along the slow axis. Accordingly, the difference between the phases of the different components may increase as the light propagates through the resonator 208. For this reason, in part, the 90 degree splice 224 switches the fiber polarization axes for the different components of light propagating through the resonator 208. The light that initially propagates along the fast axis of the resonator 224 switches to propagate along the slow axis of the resonator 224. Likewise, the light that initially propagates along the slow axis of the resonator 224 switches to propagate along the fast axis of the resonator 224. In this way the light that was propagating with a faster phase propagation before the 90 degree splice 224, propagates with a slower phase propagation after the 90 degree splice. Accordingly, the round trip phase shift of the components of light may be substantially the same, or their round trip phase shift difference is minimized, when the light is coupled out of the resonator 208 as when the light is coupled into the resonator 208. However, when the light is coupled out of the resonator 208, like when the light is coupled in, a component of the light is coupled into different polarizations, which light may interfere with and affect the accuracy of the system to a degree that depends on the phase difference between components of light detected.

Figure 3A:
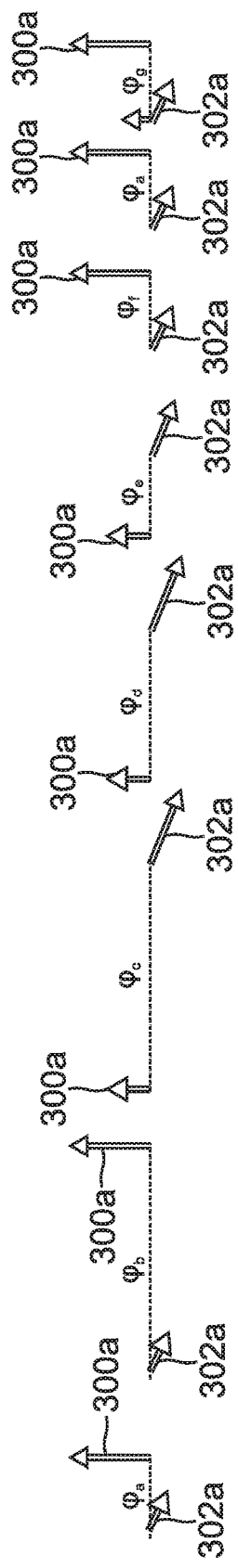
FIGS. 3A and 3B are drawings representing the phase difference between different polarizations in at least one embodiments of the present disclosure.
Figure 3B:
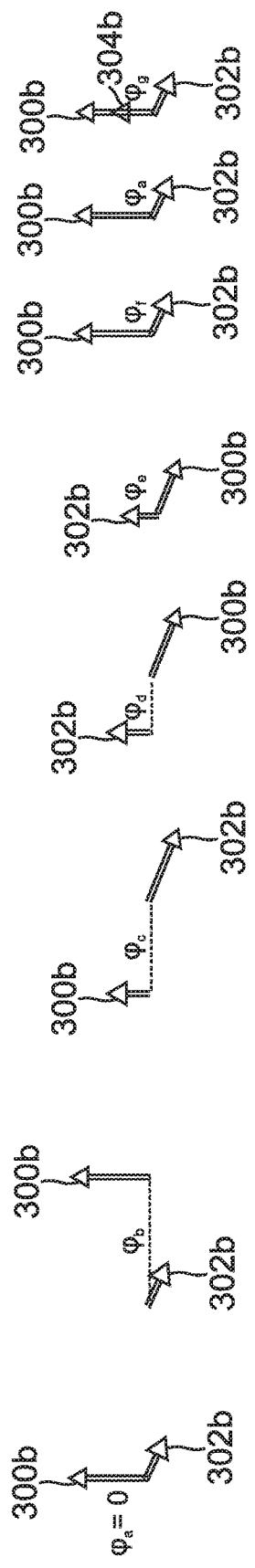

FIGS. 3A and 3B illustrate the difference in phase between different polarizations at different locations as the light propagates through the resonator 208 as indicated by the markers a-g for the clockwise direction. While only the clockwise direction is shown, the example is also applicable to the counterclockwise direction. With regards to FIG. 3A, light may be coupled into the resonator at point "a" as shown in the FIG. 2. As described above, the light is not completely coupled into the resonator 308 along a single axis, thus, the light has components along two axes, a first component 300a that is coupled into the resonator 308 whose polarization in is aligned to the fast axis of the fiber (which is parallel to the surface normal of the chip 209) and later coupled to the fast axis of the fiber, and a smaller, second component 302a that is aligned to the slow axis of the fiber coupled into the resonator along the slow axis of the fiber. As shown at point "a", the phase between the two different components is separated by a phase difference represented by $\varphi_a$. As the phase of the first component 300a propagates along the fast axis and the phase of the second component 302a propagates along the slow axis in the resonator 208, the phase difference $\varphi$ increases as the light propagates through the resonator 208. For example, $\varphi_b > \varphi_a$. The phase difference $\varphi$ may increase until the light propagates to the 90 degree splice 224 shown in FIG. 2. At the 90 degree splice, the first component 300a begins to propagate along the slow axis and the second component 302a begins to propagate along the fast axis of the resonator 208. Accordingly, the phase difference $\varphi$ that was increasing reaches its maximum $\varphi_c$ at the 90 degree splice and then begins to decrease as the light propagates through the rest of the resonator 208. At the end of the resonator 208, denoted by point "f", the phase difference $\varphi_f$ between the first component 300a and the second component 302a is substantially equal to the phase difference $\varphi_a$ at point "a". However, as the light is coupled out of the resonator 208 and directed to the photodetector, such as photodetector 230B, the light in the first component 300a and the second component 302a may be cross coupled out of the resonator such that a portion 304a of the light from the second component 302a may be coupled onto the axis (from the horizontal state to the vertical state) of the first component 300a. Alternatively, the second component 302a may also not be completely orthogonal to the first component 300a at point g. As such, the portion 304a or part of the second component 302a aligned with the first component 300a may interfere with the detection of the first component 300a based on the phase difference $\varphi_g$.

In certain implementations and as described above with respect to equation 1, the detector 230B (or 230A for light propagating in the opposite direction through the resonator 208) may measure the interference according to the following equation:

$$I = |E_1|^2 + |E_2|^2 + 2E_1 E_2 \cos(\varphi_g) \quad (6)$$

As shown, $E_1$ corresponds to a signal produced by the first component 300a and $E_2$ corresponds to a signal produced by the portion 304a or by a projection of the second component 302a onto the axis of the first component 300a, when the second component 302a is not entirely orthogonal to the first component 300a. As the magnitude of $E_2$ is not the same in both directions, the signal corresponding to $E_2$ contributes to the error. However, $|E_2|^2 \ll 1$, such that the error signal is substantially equal to $2E_1 E_2 \cos(\varphi_g)$. Accordingly, the error for $f_1$ in the clockwise direction may be equal to $2E_{1_{CW}} E_{2_{CW}} \cos(\varphi_g)$ and the error for $f_2$ in the counterclockwise direction may be equal to $2E_{1_{CCW}} E_{2_{CCW}} \cos(\varphi_g)$ and the errors for the different directions will not be equal. Thus $f_1 - f_2$ will have an error dependent on $\omega_g$. If the phase difference $\varphi_g$ can be held to zero or kept constant then there will be reduced bias instability.

FIG. 3B illustrates the change in phase difference between a first component 300b and a second component 302b as the light propagates through the resonator 208. In contrast to the phase difference co, in FIG. 3A, $\varphi_a$ in FIG. 3B is substantially equal to zero. Accordingly, the portion 304b has substantially the same phase as the first component 300b as $\varphi_g$ is also substantially equal to zero. Thus, the interference contribution by the portion 304b is reduced. As different factors can affect the phase difference of the components, such as environmental and manufacturing imperfections, the phase difference $\varphi$ between the components can vary. Accordingly, the electro-optically tunable device 246 may be driven by an AC wave to modulate and stabilize the phase difference to reduce the error in the interference. It should be noted that the other locations of the electro-optically tunable device 246 within the resonator may be used to effect this invention, including other places on chip 209 between coil fiber ends, or at a location within the fiber coil (e.g., using a fiber-pigtailed electro-optically tunable device).

Figure 4A:
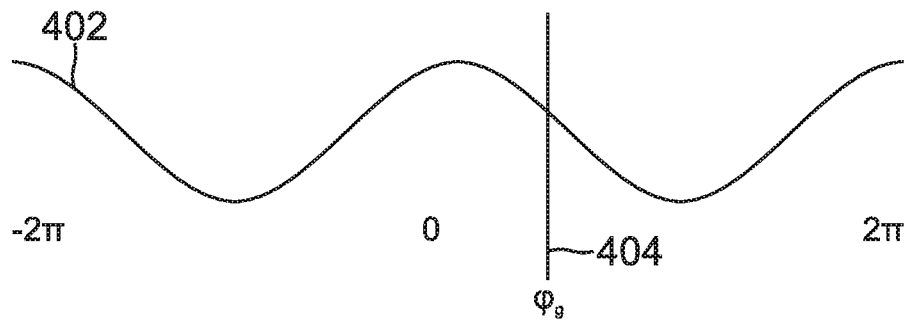
FIGS. 4A-4D are graphs illustrating the modulation of the phase difference in a representative resonator fiber optic gyroscope in different embodiments of the present disclosure.

FIGS. 4A-4D illustrate graphs that show how a modulation applied to the electro-optically tunable device 246 may be used to stabilize the error dependent on $\varphi_g$, where $\cos(\varphi_g)$ is illustrated by the curve 402 and $\varphi_g$ is represented by the line 404. As represented in FIG. 4A, the line 404 is arbitrarily located and may drift due to temperature, stress, and other environmental factors if not properly stabilized. To properly stabilize line 404, the electro-optically tunable device is driven to modulate $\varphi_g$ such that $\varphi_g$ can be represented as follows:

$$\varphi_g = \varphi_{g_o} + \varphi_{g_{dc}} + \varphi_m \sin \omega_m t \qquad (7),$$

where $\varphi_{g_o}$ is the phase due to imperfect placement of splice 224 from the exact coil midpoint (residual pathlength difference), environmentally driven changes in the residual pathlength difference and drifts according to environmental effects in the birefringence of the fiber of one side of the coil from the other, etc., and $\varphi_{g_{dc}}$ is due to the DC correction applied to the electro-optical modulator, and $\varphi_m \sin \varphi_m$ t is the AC modulation applied to the electro-optically tunable device.

Figure 4B:
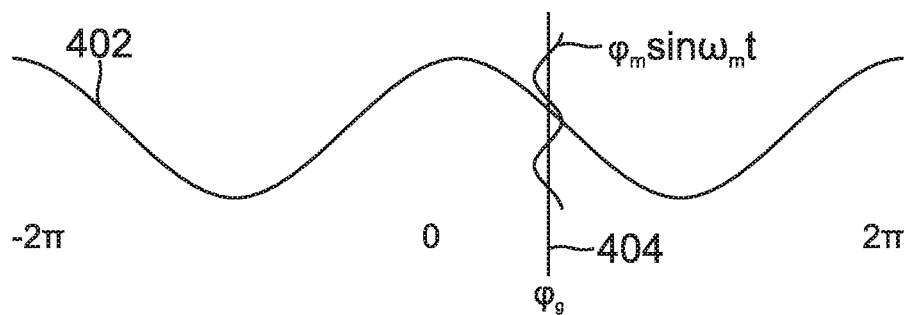
Figure 4C:
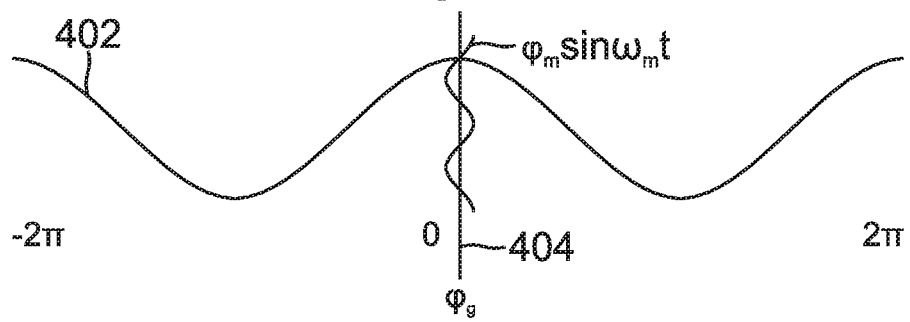
Figure 4D:
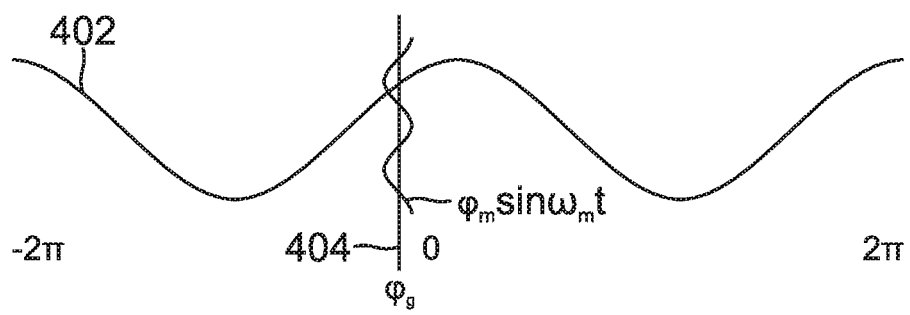

FIG. 4B-4D help to illustrate how a servo corrects the error based on $\varphi_g$, and more specifically, $\varphi_{g_o}$. In FIG. 4B, $\varphi_{g_{dc}}$ is equal to zero. In this case, $f_1 - f_2$ contains a sinusoid that is in phase with the sinusoid $\sin \omega_m t$ and has a first harmonic of $\omega_m$. Accordingly, a servo that controls the DC voltage for the electro-optically tunable device drives the electro-optically tunable device such that $\varphi_{g_{dc}}$ is negative. In FIG. 4C, $\varphi_{g_{dc}}$ is equal to $-\varphi_{g_o}$. In this case, $f_1 - f_2$ is a function of time that only has the even harmonics of $\omega_m$, primarily the second harmonic. Accordingly, a servo that controls the DC voltage for the electro-optically tunable device locks the modulation of the electro-optically tunable device to the $\varphi_{g_{dc}}$ that is equal to $-\varphi_{g_o}$, where $f_1 - f_2$ contains no variation at angular frequency $\omega_m$. FIG. 4D illustrates the situation where the servo overcorrects $\varphi_{g_{dc}}$ such that $\varphi_{g_o} + \varphi_{g_o} < 0$. In this case, $f_1 - f_2$ is a sinusoid that includes the first harmonic but the first harmonic is 180° out of phase with the sinusoid $\sin \omega_m t$. Accordingly, a servo that controls the DC voltage for the electro-optically tunable device drives the electro-optically tunable device such that $\varphi_{g_{dc}}$ is less negative. As shown above, the servo drives the electro-optically tunable device such that the line 404 stabilizes at the top of the cosine function.

Figure 5:
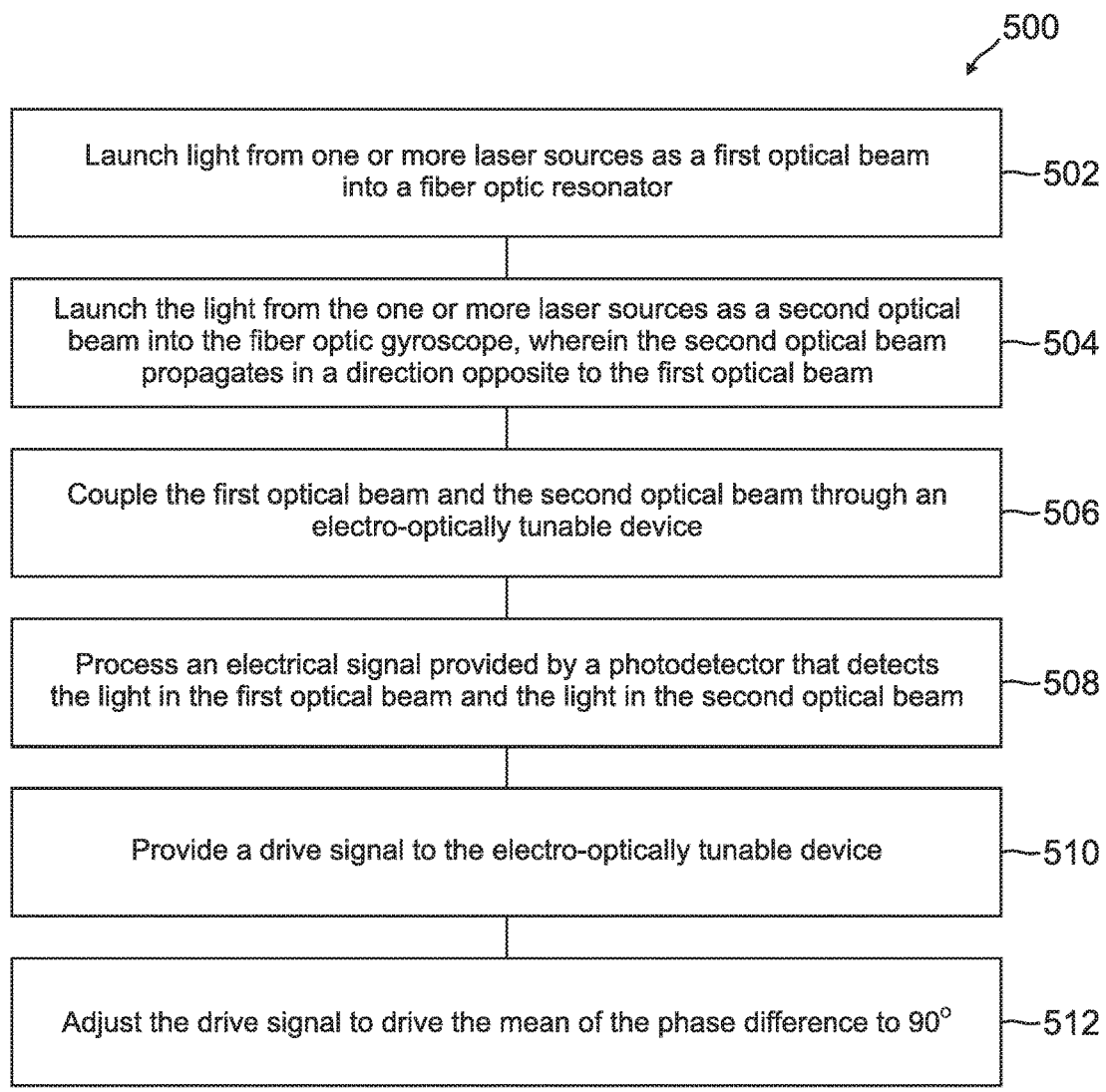
FIG. 5 is a flow diagram of a method for reducing polarization-related bias errors in resonator fiber optic gyroscopes in at least one embodiment described in the present disclosure.

FIG. 5 is a flow diagram of a method 500 for reducing polarization-related bias errors in resonating fiber optic gyroscopes. In certain implementations, the method 300 proceeds at 502 where light is launched from one or more laser sources as a first optical beam into a fiber optic resonator. Method 500 proceeds at 504 where light is launched from the one or more laser sources as a second optical beam into the fiber optic gyroscope, wherein the second optical beam propagates in a direction opposite to the first optical beam. In certain implementations, the laser source provides the light beams to an optical chip, where the optical chip couples the light beams into the fiber optic resonator.

In a further implementation, method 500 proceeds at 506, where the first optical beam and the second optical beam are coupled through an electro-optically tunable device. For example, the light that propagates through the resonator may pass through the electro-optically tunable device. In at least one implementation, the electro-optically tunable device may be located on the optical chip, such that as the light propagates through a portion of the resonator that is located on the optical chip, the light may pass through the electro-optically tunable device.

In certain embodiments, the method 500 proceeds at 508, where an electrical signal provided by a photodetector that detects the light in the first optical beam and the light in the second optical beam is processed. For example, an optical chip may couple light out of the resonator, which light may be incident on a photodetector. The photodetector may produce an electrical signal based on the incident light and provide the electrical signal to one or more processors. Method 500 then proceeds at 510, where a drive signal is provided to the electro-optically tunable device. In one implementation, the drive signal is transmitted from the same processing unit that calculates a rotation rate. However, the drive signal may be transmitted from a different processing unit than the processing unit used to calculate the rotation rate. Further, the method 500 proceeds at 512, where the drive signal is adjusted to stabilize the mean of the phase difference. For example, in one implementation, the processor monitors several periods of the drive signal to identify an average phase difference for the first and second optical beams. When the average is identified, the processor will adjust the DC component of the drive signal such that the average of the phase difference is stabilized to a certain value, such as 90° or zero degrees.

Example Embodiments

Example 1 includes a resonating fiber optic gyroscope system, the system comprising: a fiber optic resonator; one or more laser sources, wherein light from the one or more laser sources launches a first optical beam into the fiber optic resonator and a second optical beam into the fiber optic resonator in a direction opposite to the first optical beam; an electro-optically tunable device in the resonator path configured to modulate the phase difference between polarization components in the first optical beam and polarization components in the second optical beam as the first optical beam and the second optical beam propagate within the fiber optic resonator; at least one photodetector, wherein the polarization components of at least one of first optical beam and the second optical beam are incident on the at least one photodetector, wherein the at least one photodetector provides an electrical signal; and at least one processing unit configured to receive the electrical signal and calculate a rotation rate for the resonating fiber optic gyroscope and provide a drive signal for the electro-optically tunable device.

Example 2 includes the system of Example 1, further comprising an optical chip configured to couple the first optical beam and the second optical beam into and out of the fiber optic resonator.

Example 3 includes the system of Example 2, wherein the electro-optically tunable device is in the resonant path of the first and second optical beam through at least one of: being located on the optical chip; being located on a second chip that is connected to the fiber optic resonator through phase maintaining optical fiber pigtails; and being located in the fiber optic resonator.

Example 4 includes the system of any of Examples 1-3, wherein the fiber optic resonator comprises a fiber optic coil having a first end point and a second end point, wherein the fiber optic coil has a 90-degree splice located substantially half-way between the first end point and the second end point.

Example 5 includes the system of any of Examples 1-4, wherein the at least one processing unit processes the electrical signal at a faster rate to provide the drive signal than the processing of the electrical signal to provide the rotation rate.

Example 6 includes the system of any of Examples 1-5, wherein the at least one processing unit comprises a first processing unit and a second processing unit, wherein the first processing unit processes the electrical signal to determine the rotation rate and the second processing unit processes the electrical signal to provide the drive signal for the electro-optically tunable device.

Example 7 includes the system of any of Examples 1-6, wherein the drive signal is a wave having a direct current component, wherein the direct current component is adjusted such that the average phase difference between polarization components of the first optical beam and the average phase difference between polarization components of the second optical beam are stabilized.

Example 8 includes the system of Example 8, wherein the at least one processing unit monitors multiple periods of the wave to determine how to adjust the direct current component of the drive signal.

Example 9 includes the system of any of Examples 1-8, wherein the electro-optically tunable device is an optoceramic element.

Example 10 includes a method for reducing polarization-related bias errors in resonating fiber optic gyroscopes, the method comprising: launching light from one or more laser sources as a first optical beam into a fiber optic resonator; launching the light from the one or more laser sources as a second optical beam into the fiber optic gyroscope, wherein the second optical beam propagates in a direction opposite to the first optical beam; coupling the first optical beam and the second optical beam through an electro-optically tunable device; processing an electrical signal provided by a photodetector that detects the light in the first optical beam and the light in the second optical beam; providing a drive signal to the electro-optically tunable device; and adjusting the drive signal to stabilize the mean of the phase difference between polarization components in first and second optical beams.

Example 11 includes the method of Example 10, wherein the light from the one or more laser sources is launched into the fiber optic resonator through an optical chip.

Example 12 includes the method of Example 11, wherein the electro-optically tunable device is in the resonant path of the first and second optical beam through at least one of: being located on the optical chip; being located on a second chip that is connected to the fiber optic resonator through phase maintaining optical fiber pigtails; and being located in the fiber optic resonator.

Example 13 includes the method of any of Examples 10-12, wherein the fiber optic resonator comprises a fiber optic coil having a first end point and a second end point, wherein the fiber optic coil has a 90-degree splice located substantially half-way between the first end point and the second end point.

Example 14 includes the method of any of Examples 10-13, wherein the processing of the electrical signal is performed at a faster rate to provide the drive signal than the processing of the electrical signal to provide a rotation rate for the resonating fiber-optic gyroscope.

Example 15 includes the method of any of Examples 10-14, wherein the drive signal is a wave having a direct current component, wherein adjusting the drive signal comprises adjusting the direct current component.

Example 16 includes the method of Example 15, wherein processing the electrical signal comprises monitoring multiple periods of the wave to determine how to adjust the direct current component of the drive signal.

Example 17 includes a resonating fiber optic gyroscope system, the system comprising: a fiber optic resonator having a fiber optic coil with a first end point and a second end point, wherein the fiber optic coil has a 90-degree splice located substantially half-way between the first end point and the second end point; one or more laser sources that produce a first optical beam and a second optical beam; an optical chip configured to couple the first optical beam and the second optical beam into and out of the fiber optic resonator in opposite directions; an electro-optically tunable device configured to modulate the phase difference of polarization components of the first optical beam and second optical beam as the first optical beam and the second optical beam propagate within the fiber optic resonator; at least one photodetector, wherein the first optical beam and the second optical beam are incident on the at least one photodetector, wherein the at least one photodetector provides an electrical signal; and at least one processing unit configured to receive the electrical signal and calculate a rotation rate for the resonating fiber optic gyroscope and provide a drive signal for the electro-optically tunable device.

Example 18 includes the system of Example 17, wherein the drive signal is a wave having a direct current component, wherein the direct current component is adjusted such that the average phase difference between polarization components the first optical beam and between polarization components of the second optical beam are stabilized.

Example 19 includes the system of Example 18, wherein the wave consists of a triangle wave and a direct current component and the at least one processing unit monitors multiple periods of the triangle wave to determine how to adjust the direct current component of the drive signal.

Example 20 includes the system of any of Examples 17-19, wherein the electro-optically tunable device is an optoceramic element.

In various alternative embodiments, system elements, method steps, or examples described throughout this disclosure may be implemented on one or more computer systems, field programmable gate array (FPGA), or similar devices comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A resonating fiber optic gyroscope system, the system comprising:
    a fiber optic resonator;
    one or more laser sources, wherein light from the one or more laser sources launches a first optical beam into the fiber optic resonator and a second optical beam into the fiber optic resonator in a direction opposite to the first optical beam;
    an electro-optically tunable device in the resonator path configured to modulate the phase difference between polarization components in the first optical beam and polarization components in the second optical beam as the first optical beam and the second optical beam propagate within the fiber optic resonator;
    at least one photodetector, wherein the polarization components of at least one of first optical beam and the second optical beam are incident on the at least one photodetector, wherein the at least one photodetector provides an electrical signal; and
    at least one processing unit configured to receive the electrical signal and calculate a rotation rate for the resonating fiber optic gyroscope and provide a drive signal for the electro-optically tunable device;
    wherein the drive signal is a wave having a direct current component, wherein the direct current component is adjusted such that the average phase difference between polarization components of the first optical beam and the average phase difference between polarization components of the second optical beam are stabilized.

2. The system of claim 1, further comprising an optical chip configured to couple the first optical beam and the second optical beam into and out of the fiber optic resonator.

3. The system of claim 2, wherein the electro-optically tunable device is in the resonant path of the first and second optical beam through at least one of:
    being located on the optical chip;
    being located on a second chip that is connected to the fiber optic resonator through phase maintaining optical fiber pigtails; and
    being located in the fiber optic resonator.

4. The system of claim 1, wherein the fiber optic resonator comprises a fiber optic coil having a first end point and a second end point, wherein the fiber optic coil has a 90-degree splice located substantially half-way between the first end point and the second end point.

5. The system of claim 1, wherein the at least one processing unit processes the electrical signal at a faster rate to provide the drive signal than the processing of the electrical signal to provide the rotation rate.

6. The system of claim 1, wherein the at least one processing unit comprises a first processing unit and a second processing unit, wherein the first processing unit processes the electrical signal to determine the rotation rate and the second processing unit processes the electrical signal to provide the drive signal for the electro-optically tunable device.

7. The system of claim 1, wherein the at least one processing unit monitors multiple periods of the wave to determine how to adjust the direct current component of the drive signal.

8. The system of claim 1, wherein the electro-optically tunable device is an optoceramic element.

9. A method for reducing polarization-related bias errors in resonating fiber optic gyroscopes, the method comprising:
    launching light from one or more laser sources as a first optical beam into a fiber optic resonator;
    launching the light from the one or more laser sources as a second optical beam into the fiber optic gyroscope, wherein the second optical beam propagates in a direction opposite to the first optical beam;
    coupling the first optical beam and the second optical beam through an electro-optically tunable device;
    processing an electrical signal provided by a photodetector that detects the light in the first optical beam and the light in the second optical beam;
    providing a drive signal to the electro-optically tunable device, wherein the drive signal is a wave having a direct current component; and
    adjusting the drive signal to stabilize the mean of a phase difference between polarization components in the first and second optical beams, wherein adjusting the drive signal comprises adjusting the direct current component.

10. The method of claim 9, wherein the light from the one or more laser sources is launched into the fiber optic resonator through an optical chip.

11. The method of claim 10, wherein the electro-optically tunable device is in the resonant path of the first and second optical beam through at least one of:
    being located on the optical chip;
    being located on a second chip that is connected to the fiber optic resonator through phase maintaining optical fiber pigtails; and
    being located in the fiber optic resonator.

12. The method of claim 9, wherein the fiber optic resonator comprises a fiber optic coil having a first end point and a second end point, wherein the fiber optic coil has a 90-degree splice located substantially half-way between the first end point and the second end point.

13. The method of claim 9, wherein the processing of the electrical signal is performed at a faster rate to provide the drive signal than the processing of the electrical signal to provide a rotation rate for the resonating fiber-optic gyroscope.

14. The method of claim 9, wherein processing the electrical signal comprises monitoring multiple periods of the wave to determine how to adjust the direct current component of the drive signal.

15. A resonating fiber optic gyroscope system, the system comprising:
- a fiber optic resonator having a fiber optic coil with a first end point and a second end point, wherein the fiber optic coil has a 90-degree splice located substantially half-way between the first end point and the second end point;
- one or more laser sources that produce a first optical beam and a second optical beam;
- an optical chip configured to couple the first optical beam and the second optical beam into and out of the fiber optic resonator in opposite directions;
- an electro-optically tunable device configured to modulate the phase difference of polarization components of the first optical beam and second optical beam as the first optical beam and the second optical beam propagate within the fiber optic resonator;
- at least one photodetector, wherein the first optical beam and the second optical beam are incident on the at least one photodetector, wherein the at least one photodetector provides an electrical signal; and
- at least one processing unit configured to receive the electrical signal and calculate a rotation rate for the resonating fiber optic gyroscope and provide a drive signal for the electro-optically tunable device;

wherein the drive signal is a wave having a direct current component, wherein the direct current component is adjusted such that the average phase difference between polarization components of the first optical beam and between polarization components of the second optical beam are stabilized.

16. The system of claim 15, wherein the wave consists of a triangle wave and a direct current component, and the at least one processing unit monitors multiple periods of the triangle wave to determine how to adjust the direct current component of the drive signal.

17. The system of claim 15, wherein the electro-optically tunable device is an optoceramic element.

* * * * *